United States Patent Office 3,763,076
Patented Oct. 2, 1973

3,763,076
VINYL CHLORIDE POLYMERS SUITABLE FOR USE IN COATING COMPOSITIONS
Roger Hogenmuller, Sainte-Foy-les-Lyon, Jacques Massebeuf, Serezin-du-Rhone, and Paul Medard, Oullins, France, assignors to Rhone-Poulenc S.A., Paris, France
No Drawing. Filed Dec. 6, 1971, Ser. No. 205,367
Claims priority, application France, Dec. 8, 1970, 7044136
Int. Cl. C08f 15/40
U.S. Cl. 260—31.2 R
17 Claims

ABSTRACT OF THE DISCLOSURE

The invention provides a vinyl polymer which comprises (a) about 60 to 90% by weight of units derived from vinyl chloride;
(b) about 2 to 25% by weight of units derived from a monoester of a diol containing 3 to 6 carbon atoms and a methacrylic acid or acrylic acid; and
(c) about 2 to 25% by weight of units derived from at least one vinyl ester of a saturated aliphatic monocarboxylic acid in which the carboxyl group is bonded to to a tertiary or quaternary carbon atom;

the polymer having a reduced viscosity of about 20 to 150 cm.$^3$/g. (measured as an 0.5% by weight solution in cyclohexanone at 25° C.), which is useful in coating compositions which have good resistance to heat and chemical attack.

---

The present invention relates to vinyl polymers suitable for use in coating compositions. More precisely, the invention relates to vinyl polymers which yield coatings of good heat stability.

It is known that, industrially, varnishes and paints are frequently subjected to stoving at temperatures up to 150° C., in order to accelerate the removal of solvents and, where appropriate, to crosslink the film-forming constituent of the coating composition; the polymers of the present invention can generally withstand heating for several minutes at such a temperature without damage.

Also the coatings possess high stability to ultraviolet rays; this property is very valuable because one of the essential properties required for varnishes and paints is the absence of deterioration following prolonged exposure to light.

The present invention provides a vinyl polymer which comprises (a) 60 to 90% by weight of units derived from vinyl chloride; (b) 2 to 25% by weight of units derived from a monoester of a diol containing 3 to 6 carbon atoms and a methacrylic acid or acrylic acid; and (c) 2 to 25% by weight of units derived from at least one vinyl ester of a saturated aliphatic monocarboxylic acid in which the carboxyl group is bonded to a tertiary or quaternary carbon atom; the polymer having a reduced viscosity of 20 to 150 cm.$^3$/g. (measured as an 0.5% by weight solution in cyclohexanone at 25° C.).

Component (b) is hereafter referred to as a diol mono-(meth)acrylate. The acids from which the component (c) is derived are hereinafter referred to as "branched acids."

Particularly valuable polymers of the present invention are those which comprise (a) 75 to 85% by weight of units derived from vinyl chloride; (b) 5 to 15% by weight of units derived from a said diol mono(meth)acrylate and (c) 5 to 15% by weight of units derived from at least one said vinyl ester.

The said reduced specific viscosity of the polymers according to the invention is preferably from 30 to 60 cm.$^3$/g.

Examples of suitable diol mono(meth)acrylates are monoacrylates and monomethacrylates of 1,2- and 1,3-propanediol, 1,2-, 1,3-, 1,4- and 2,3-butanediol, of a pentanediol and of a hexanediol. Preferably, the monoacrylate of 1,3-propanediol is used.

Suitable branched acids which may be used are the mixtures of acids obtained by reaction of formic acid with mixtures of olefins containing 4 to 18 carbon atoms per molecule (i.e. the acids contain 5 to 19 carbon atoms; for example the dimer or trimer of isobutene or of propylene) in the presence of catalysts such as phosphoric acid or sulphuric acid; the preparation of these branched acids is described in, for example, French patent specification No. 1,350,937. Particularly valuable acids are those derived from mono-olefins with 8 to 10 carbon atoms i.e. the acids contain 9 to 11 carbon atoms in which the quaternary carbon atom to which is attached the carboxyl group carries at least one methyl substituent.

The preparation of the vinyl esters of branched acids can be carried out in accordance with known processes, for example by reacting the said acids with vinyl acetate in the presence of a mercury salt (see, for example, French patent specification No. 1,350,937).

The preparation of the polymers of the invention can generally be carried out by bulk, aqueous-emulsion or solution polymerisation.

The usual techniques for the preparation of vinyl polymers can be used; as any conventional catalyst may generally be used. Thus, it is generally possible to use a peroxide catalyst, such as benzoyl peroxide, 2,4-dichlorobenzoyl peroxide, lauroyl peroxide, tert-butyl peroxide, isopropyl peroxide or other peroxygenated compound such as potassium persulphate or hydrogen peroxide; or a diazo compound such as azo-bis-isobutyronitrile. It is also generally possible to use redox systems or to initiate the polymerisation by irradiation, for example by means of ultraviolet radiation.

The polymerisation temperature is generally from 20 to 150° C., preferably from 40 to 80° C.

In emulsion polymerisation, it is usual to employ emulsifiers and/or surface-active agents. The polymerisation is preferably carried out in the presence of anionic surface-active agents and/or non-ionic surface-active agents and also in the presence of unsaturated carboxylic acids or of monoesters of unsaturated dicarboxylic acids, or of monovinyl esters of saturated dicarboxylic acids. Examples of suitable anionic surface-active agents are alkylsulphonates, arylsulphonates and alkylarylsulphonates, for example sodium dodecylbenzenesulphonate. Examples of suitable non-ionic surface-active agents are condensation products of alkylene oxides with alcohols, phenols or acids.

In general, 0.5 to 2 parts by weight of an anionic surface-active agent and 0.5 to 6 parts by weight of a non-ionic surface-active agent may be used per 100 parts by weight of the mixture of vinyl monomers.

The preferred method of preparing the copolymers by emulsion polymerisation involves emulsifying the monomers and then introducing a part of the emulsion into the polymerisation reactor, introducing all or part of the catalyst and raising the temperature to cause the polymerisation to take place, and then adding the remainder of the monomer emulsion. Of course, it is generally also possible to use any of the other known techniques for the emulsion polymerisation of vinyl monomers.

Alternatively it is generally possible to polymerise the monomers in a liquid which is a solvent for them but not for the polymer.

The solubility of the polymer depends on the proportion of the various monomers. For copolymers containing at least 75% of vinyl chloride units, the above solvents can be, for example, aliphatic hydrocarbons such as butane, hexane or white spirit No. 1, aromatic hydrocarbons such as benzene, toluene or xylene or alcohols such as methanol or ethanol.

Finally, according to a preferred method of working, the polymerisation can be carried out in a solvent for the polymer or in a mixture of suitable solvents. Examples of such solvents are ketones such as acetone and methyl ethyl ketone, esters such as methyl acetate and ethyl acetate, and ethers such as methoxymethanol, 2-ethoxyethanol-ol, 1-methoxypropan-2-ol and dioxan.

In solution polymerisation various methods of working can be used; in particular, all or part of one or all of the reactants can be introduced into the polymerisation reactor, the remaining portions and/or reactants being introduced during the polymerisation. The catalyst may be introduced in a similar way. Where material is introduced in the course of the reaction, it can be introduced either in portions or continuously.

Solvent polymerisation has the advantage that solutions are produced which can generally be used directly in coating operations. Of course, if the polymerisation has been carried out in a non-solvent for the polymer it is always possible to separate the polymer and then to dissolve it in a solvent, such as those quoted above, to prepare a coating composition.

The coating compositions of the invention are essentially polymer solutions whose viscosity at 25° C. generally varies from more than 1 centipoise to about 10 poises. These solutions can be used as they are or can contain various adjuvants conventionally used in coating compositions, such as at least one filler, pigment and/or a crosslinking agent.

Suitable fillers which may be used include antimony oxides, calcined aluminium silicates, colloidal silicas and matting silicas, derivatives of organophilic bentonites, kaolins, and micronised particles of talc, mica or asbestos. Suitable pigments are titanium oxide, carbon black, synthetic iron oxides, green chromium oxides, chrom yellows, molybdenum oranges and reds, cadmium, manganese or cobalt pigments, or organic pigments such as phthalocyanine blues and greens. Suitable crosslinking agents are condensation products of urea, melamine or a phenol with formaldehyde for example hexamethoxymethylmelamine; a polyisocyanate or an epoxide such as a polyglycidyl ether or ester obtained by reaction of epihalogenohydrin or dihalogenohydrin with, respectively, a polyhydroxylic compound or a polycarboxylic acid, or a polyglycidyl ether or ester obtained by homopolymerisation or copolymerisation of unsaturated glycidyl ethers or esters.

The amount of crosslinking agent used is generally from 2 to 50% by weight relative to the weight of the polymer. The crosslinking is generally carried out at temperatures which can vary from ambient temperature to 280°; it is generally carried out at a temperature of from 100 to 150° C. The crosslinking usually occurs during the heating which also eliminates the solvent or solvents. The resulting crosslinked coatings are generally insoluble in water, alkalis and the usual organic solvents such as esters, ketones, hydrocarbons and alcohols.

The polymers of the invention can be applied to various substrates such as wood, paper, metals, glass and synthetic materials to produce coatings. The films thus formed on these substrates generally have high heat stability and high stability to ultraviolet radiation. The first of these properties generally enables the polymers to be used as film-forming constituents in varnishes or paints whose drying is accelerated by heating. The second property permits their use for coating surfaces exposed to light.

Solutions of polymers of the invention can generally be diluted with aromatic and aliphatic hydrocarbons, especially with white spirit No. 1 which is important as white spirit No. 1 is a solvent commonly employed in the varnish and paint industries and because its use is not subject to restriction.

The following example further illustrates the invention.

EXAMPLE

A 19 litre stainless steel autoclave, equipped with a stirrer, devices for regulating the heating and controlling pressures and temperatures and pumps for introducing the reactants was used. 600 g. of vinyl chloride were introduced after the autoclave had been flushed with a stream of nitrogen.

The vinyl chloride originated from a stainless steel cylinder (10 litres) placed on a balance and connected to the autoclave. The autoclave was opened to remove the vinyl chloride and the pressure inside the autoclave was then reduced to 160 mm. of mercury. 225 g. of "Versatate VEOVA 9.11," 75 g. of 1,3-propanediol monoacrylate, 6,600 cm.³ of acetone and 3,825 g. of vinyl chloride were then introduced.

"Versatate VEOVA 9.11" is a mixture of branched $C_9$ to $C_{11}$ monocarboxylic acid vinyl esters of formula:

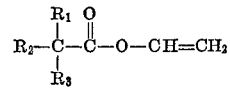

in which $R_1$, $R_2$ and $R_3$ represent straight chain saturated hydrocarbon radicals such that the number of carbon atoms in the ester, excluding the vinyl group, is 9 to 11. This product has the following properties:

| | |
|---|---|
| Average molecular weight | 197 |
| Viscosity at 20° C., cst. | 2.2 |
| Refractive index $n_D^{20}$ | 1.439 |
| Acid number | 1 |
| Bromine number | 78–80 |
| Boiling point (100 mm. Hg), ° C. | 129–180 |

The reactants were heated to 50° C., 6.75 g. of isopropyl percarbonate (as a 30% solution in methyl phthalate) were then introduced and the feed pump was flushed with 125 cm.³ of acetone.

The pressure inside the autoclave was then 2.5 bars. When it dropped to 2.37 bars, 20 g. of 1,3-propanediol monoacrylate were introduced; this operation was repeated each time the pressure dropped by 0.13 bar.

During the polymerisation, 6.75 g. of isopropyl percarbonate (as a 30% solution in methyl phthalate) were introduced at the 6th and 12th hours, and each time the feed pump was flushed with 125 cm.³ of acetone.

After 15 hours, when a total (including the initial introduction) of 375 g. of 1,3-propanediol monoacrylate had been added, no further amounts were added and the polymerisation was continued for 30 minutes.

3,800 cm.³ of acetone were then introduced and the mixture was cooled to 20° C. Stirring was continued for one hour thereafter. A limpid, slightly bluish solution was obtained.

The polymer was recovered by precipitation in water and was then filtered off and dried (for 24 hours at 45–50° C.).

The polymer was ground; a white powder was obtained. The polymer showed the following characteristics.

(a) Percentage by weight of the monomers polymerised:

| | Percent |
|---|---|
| Vinyl chloride | 83.5 |
| 1,3-propanediol monoacrylate | 8 |
| "VEOVA 9.11" | 8.5 |

The proportion of vinyl chloride was determined by measuring the chlorine after mineralisation of the polymer, and the proportion of 1,3-propanediol monoacrylate was determined by measuring the free hydroxyl groups.

(b) Reduced specific viscosity: 45 cm.³/g. (measured at 25° C. on an 0.5% solution in cyclohexanone).

The various experiments and determinations described below were carried out in order to assess the properties of the polymer. In each case the results obtained with a copolymer containing 90% by weight of vinyl chloride, 4% of vinyl acetate and 6% of vinyl alcohol, prepared by partial hydrolysis of a vinyl chloride/vinyl acetate copolymer, are given by way of comparison. The results obtained with this comparison copolymer are shown in brackets.

(1) Characteristics of a solution of polymer in ethyl acetate (a) Viscosity of a 20% solution of polymer: the measurement was carried out at 20° C., in accordance with French Standard Specification AFNOR NF T 30,014, cup No. 4: viscosities of 64 seconds [40 seconds] were found.

(b) Transparency: the height of the solution (in a tube of 20 mm. diameter and 600 mm. height) through which it was no longer possible to distinguish a black disc was measured. [This height should be as large as possible.] 550 mm. [350 mm.] were found.

(c) Colour: this was determined by comparing the polymer solution with aqueous solutions of potassium dichromate of various concentrations. (These concentrations were expressed in normalities.) N/5,000 [N/1,500] was found.

(d) Storage stability: no change was noted after one month [same].

(2) Crosslinking of the polymers

A solution containing 10 g. of the polymer, 40 g. of methyl ethyl ketone, 1 g. of hexamethoxymethylmelamine and 0.1 cm.³ of paratoluenesulphonic acid was prepared.

A film was cast and after drying for 15 hours at 25° C. the film was heated for 40 minutes at 120° C., cooled to 25° C., and then weighed (P1). The film was then left for 15 hours in methyl ethyl ketone at 25° C. and was then withdrawn, dried (temperature 100° C.—drying time 2 hours) and reweighed (P2). The degree of crosslinking, expressed as a percentage, is defined as:

$$100 \times \frac{P2}{P1}$$

The degree of crosslinking was found to be 100% [99%].

(3) Dilutability of the non-crosslinked resin in solvents (a) Benzene: 5 g. of resin were dispersed in 50 cm.³ of benzene and 10 cm.³ of acetone were added to dissolve the resin. The dilutability, i.e. the number of cm.³ of benzene required to cause incipient turbidity, was measured. This whole test was carried out at 25° C. The dilutability with benzene was found to be 210 cm.³ [128 cm.³].

(b) White spirit No. 1: 5 g. of resin were dissolved in 50 cm.³ of acetone. White spirit No. 1 was then added at 25° C. until incipient turbidity of the solution appeared. The dilutability with white spirit No. 1 was found to be 51 cm.³ [44.5 cm.³].

(4) Heat stability (a) A tablet of polymer (diameter: about 12 mm., thickness about 5 mm.) was produced by moulding. This tablet was heated at 130° C. for 1 hour and then reduced to a powder. The heat stability was measured by the increased in colour of the polymer. This increase in colour was determined by the difference in the optical densities of 1% by weight strength solutions in dimethylformamide of, firstly, the polymer which had undergone the heat treatment and, secondly, the polymer which had not undergone this treatment. The lowest figures correspond to the most stable products. The heat stability was found to be 2 [64].

(b) An approximately 1 mm. thick film (after drying for 15 hours at 25° C.) was manufactured by casting from a 20% by weight strength solution of the polymer in ethyl acetate. The film was placed in an oven and its appearance noted:

after 15 minutes at 100° C.: colourless [colourless]
after 1 hour at 100° C.: colourless [chestnut]
after 15 minutes at 150° C.: colourless [chestnut].

(5) Stability to ultraviolet rays

This experiment was carried out under the following conditions:

A 20% by weight strength solution of polymer in methyl ethyl ketone was prepared. This solution was cast as a 250µ thick layer on a glass plate. After drying (about 15 minutes) 140 x 80 mm. samples were cut from the plate which had been varnished in this way and were then arranged on a rotating table arranged 30 cm. above an ultraviolet lamp. The lamp (300 watts) was located on the axis of rotation of the table. The temperature in the exposure chamber was 55° C.

The yellowing of the film subjected to the test was determined as follows:

The light source emitted a ray of light (wavelength 457 mµ); this ray was reflected from an enamelled white earthenware tile which carried the glass plate coated with the film of varnish; the intensity of the reflected ray was measured by means of a photoelectric cell.

By way of comparison, the values of the intensity obtained on the earthenware in the absence of a glass plate and on the earthenware carrying a glass plate not coated with varnish were measured. The values obtained were as follows (arbitrary units):

| | |
|---|---|
| On bare earthenware | 92.8 |
| On earthenware carrying a glass plate | 84 |
| On earthenware carrying a varnished glass plate: | |
| Varnished film not exposed to UV | 83 [83] |
| Varnished film after exposure for 2 days | 82.5 [68] |
| Varnished film after exposure for 10 days | 80 [4] |
| Varnished film after exposure for 20 days | 74 [3] |

This test showed that the polymers of the invention had excellent resistance to ultraviolet light.

We claim:
1. A vinyl polymer which consists of
   (a) about 60 to 90% by weight of units derived from vinyl chloride;
   (b) about 2 to 25% by weight of units derived from a monoester of a diol containing 3 to 6 carbon atoms and a methacrylic acid or acrylic acid; and
   (c) about 2 to 25% by weight of units derived from at least one vinyl ester of a saturated aliphatic monocarboxylic acid in which the carboxyl group is bonded to a carbon atom such that said carbon is tertiary or quaternary;
the polymer having a reduced viscosity of about 20 to 150 cm.³/g. (measured as an 0.5% by weight solution in cyclohexanone at 25° C.).

2. A vinyl polymer according to claim 1 which consists of
   (a) about 75 to 85% by weight of units derived from vinyl chloride;
   (b) about 5 to 15% by weight of units derived from a said monoester; and
   (c) about 5 to 15% by weight of units derived from at least one said vinyl ester.

3. A vinyl polymer according to claim 1 in which units (b) are derived from 1,3-propanediol monoacrylate.

4. A vinyl polymer according to claim 1 in which units (c) are derived from at least one vinyl ester of a said saturated acid containing 5 to 19 carbon atoms.

5. A vinyl polymer according to claim 4 in which the said saturated acid contains 9 to 11 carbon atoms and in which the quaternary carbon atom carrying the carboxyl group comprises a methyl group.

6. A vinyl polymer according to claim 1 which has a said reduced specific viscosity about 30 to 60 cm.³/g.

7. In a coating composition comprising a polymer in solution, the improvement wherein the polymer is one claimed in claim 1.

8. A composition according to claim 7 in which the solvent is a ketone, an ester or an ether.

9. A composition according to claim 7 which is diluted by at least one aliphatic or aromatic hydrocarbon.

10. A composition according to claim 9 which is diluted with white spirit No. 1.

11. A composition according to claim 7 which contains at least one filler, pigment and/or crosslinking agent.

12. A composition according to claim 11 in which the crosslinking agent is a polyisocyanate, an epoxide or a condensation product of urea, melamine or a phenol with formaldehyde.

13. A composition according to claim 12 in which the crosslinking agent is hexamethoxymethylmelamine.

14. Process for coating a substrate which comprises applying thereto a composition as claimed in claim 7 and drying the composition.

15. Process according to claim 14 wherein the drying is accelerated by heating.

16. Process according to claim 15 wherein the heating is carried out at 100° to 150° C.

17. A substrate coated by a process as claimed in claim 14.

References Cited

UNITED STATES PATENTS

| | | | |
|---|---|---|---|
| 3,272,785 | 9/1966 | Lewis | 260—80.75 |
| 2,686,172 | 8/1954 | Wolf | 260—80.75 |
| 3,269,994 | 8/1966 | Horn | 260—80.75 |
| 3,186,974 | 6/1965 | Verberg | 260—87.1 |
| 3,231,529 | 1/1966 | Kuhn | 260—80.81 |
| 3,260,704 | 7/1966 | Slocombe | 260—80.75 |

FOREIGN PATENTS

| | | |
|---|---|---|
| 1,005,796 | 9/1965 | Great Britain. |

MORRIS LIEBMAN, Primary Examiner

P. R. MICHL, Assistant Examiner

U.S. Cl. X.R.

260—32.8 R, 33.2 R, 33.6 UA, 80.75